(12) United States Patent
Tsai et al.

(10) Patent No.: US 6,678,075 B1
(45) Date of Patent: Jan. 13, 2004

(54) SLIDE SECURING DEVICE FOR FLATBED SCANNING SYSTEM

(75) Inventors: Jenn-Tsair Tsai, Taipei (TW); Chieng-Ming Tsaur, Hsinchu (TW)

(73) Assignee: Mustek Systems Inc. (TW)

( * ) Notice: Subject to any disclaimer, the term of this patent is extended or adjusted under 35 U.S.C. 154(b) by 749 days.

(21) Appl. No.: 09/588,642

(22) Filed: Jun. 7, 2000

(51) Int. Cl.⁷ .............................. H04N 1/04; G03G 15/00
(52) U.S. Cl. ...................... 358/487; 358/474; 358/497; 399/378; 355/75
(58) Field of Search ................................. 358/487, 506, 358/497, 471, 474, 400; 399/378, 377; 355/75; 250/234–236; 353/120, 108, 103

(56) References Cited

U.S. PATENT DOCUMENTS

| | | | | |
|---|---|---|---|---|
| 3,958,348 A | * | 5/1976 | Sakamoto ..................... | 40/374 |
| 3,973,344 A | * | 8/1976 | Frankel ........................ | 40/706 |
| 4,202,122 A | * | 5/1980 | Namiki ........................ | 40/710 |
| 4,832,482 A | * | 5/1989 | Kallenberg ................... | 353/120 |
| 5,835,201 A | * | 11/1998 | Itano et al. ................... | 355/75 |
| 6,157,440 A | * | 12/2000 | Ikeda .......................... | 355/75 |
| 6,169,611 B1 | * | 1/2001 | Brook, III et al. ........... | 358/487 |
| 6,195,182 B1 | * | 2/2001 | Kunishige ................... | 358/487 |
| 6,295,143 B1 | * | 9/2001 | Lee et al. ..................... | 358/487 |

FOREIGN PATENT DOCUMENTS

EP 0 786 688 A2 * 7/1997

* cited by examiner

*Primary Examiner*—Cheukfan Lee
(74) *Attorney, Agent, or Firm*—Lowe Hauptman Gilman & Berner, LLP

(57) ABSTRACT

A slide securing device, using in a flatbed scanner, includes a frame and a securing cell. The securing cell comprises an aperture, a first securing clip, a second securing clip, a first securing groove, a second securing groove, a picking portion, a first support member and a second support member. The slide securing device utilizes proper clips for holding slides. Thus, the scanner can directly scan the secured slides by predetermined parameters and reset mode, in order to save scanning time. Further, the securing grooves maintains slides at a fixed height to improve the scanning quality.

10 Claims, 7 Drawing Sheets

Figrue 3

SLIDE SECURING DEVICE FOR FLATBED SCANNING SYSTEM

BACKGROUND OF THE INVENTION

1. Field of the Invention

The present invention generally relates to an apparatus for mounting slides. Specifically, the present invention is a slide securing device using in a flatbed scanner.

2. Background Description

Nowadays flatbed scanners are fully developed computer accessories available on the consumer market. The flatbed scanner can scan colorful documentation and black-white documentation into computer files in order to preserve ordinary images or pictures. The flatbed scanner can also scan particular transparent documents, such as slides or films, by changing the light path from other direction. The transparent scanning operation can be well done in the same manner as ordinary scanning operation.

In the operation for scanning general colorful or black-white documents, the sizes of the documents usually are regular sizes, such as A4, A3, Letter or B5. The flatbed scanner is therefore comprising a document glass for positioning an original document to be scanned. Thus, for the regular sizes, the user simply follows the instructions, such as placing the original document to a predetermined position of the document glass of the scanner, selecting a corresponding size of the original document, and setting parameters of the scanning conditions in a driver program. The scanner will scan the original document by the settings. The scanner is therefore able to scan different documents by acquiring different settings.

Referring to FIG. 1, however, in case of scanning slides, the sizes of slides are regulated but differing from A3, A4, B4, or Letter size. Actually, the sizes of slides are much smaller that the area of the document glass 13. Thus, the user can scan several slides 14 at one time in order to save scanning time. Problems are occurring by this kind of operation. The user is usually unable to align several slides 14 on the document glass 13. Therefore, it is necessary to preselect the positions of each slide 14 from the selection feature provided by the driver program, before main scanning process. By this preselection, the scanner can scan the slides. Nonetheless, the auxiliary process of preselecting slides from the driver program consumes the operation time and causes user's inconvenience.

To solve the above-mentioned problem, a driver software implementing an automatic slide locating feature is available on the market. However, it still takes lots time to locate and scan the slides. Because the sizes of slides are regulated, it is still not efficient if a process of preselecting slides' location is needed.

Thus, there is a locating device provided for scanning original objects which have regulated sizes, for example, slides. The locating device is provided for the scanning process in a flatbed scanner. Referring to FIG. 2, the locating device 2 comprises a frame 22 and at least one opening 23. First, the frame 22 is positioned on the document glass 13. Next, slides are placed in the opening 23 (slides not shown) in order. After placing down the cover 12, start the scanning program by a predetermined scanning mode. The scanned images are then acquired.

The frame 22 of the locating device is usually made by a soft plastic material. There are several openings as the similar size of slides. However, there is not featured any fixation mechanism in the mentioned locating device. Therefore, the locating device cannot provide precise positions of slides during scanning. Moreover, even though the size of slides is regulated, the thickness of the frame of the slides will vary in different framing brands. The variant thickness of the slide frames will cause diffusion of the scanned image because the scanner cannot precisely focus on slides which have different thickness.

In Taiwan Utility Patent (Republic of China Utility Patent) No. 294,428, there is disclosed a fixation device. Once a frame holds several slides, the frame is placed into a holding member. The holding member is then inserted to a dedicated scanner for transparent scanning process. Thus, the holding member needs an upper and a lower portions for holding the frame. In addition, the dedicated scanner must implement a particular apparatus in order to scan slides via a particular method. This operation is too complicated and inconvenient to the user. In addition, because the slide is only secured by one clip, the slide is able to slip to another position. It causes differences between the actual slide position and predetermined position in the driver program. The actual slide position therefore cannot be acquired. Further, the focus of the scanner cannot be precisely achieved since the slides are not fully secured in a predetermined position and at a fixed height.

SUMMARY OF THE INVENTION

It is therefore an object of the present invention to provide an apparatus for securing slides on a scanning system in order to acquire precise quality of scanned images.

According to the present invention, the securing cell includes plural clips to mount slides. The scanner is able to directly scan the slides by a predetermined scanning mode in order to save scanning time. Further, the present invention secures slides at a fixed height. The scanner can scan slides by a fixed focus. The scanning quality is therefore improved.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
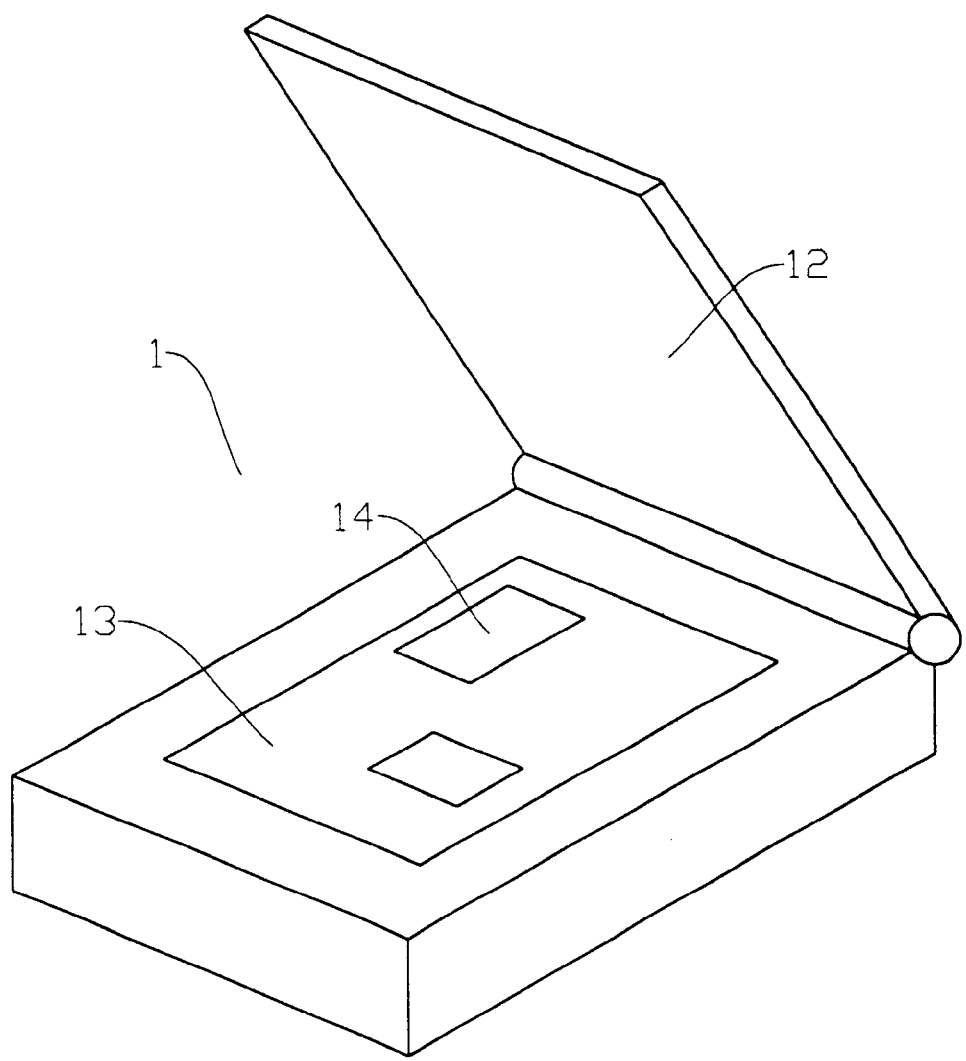
FIG. 1 is a general scheme of prior slide scanning process.
Figure 2:
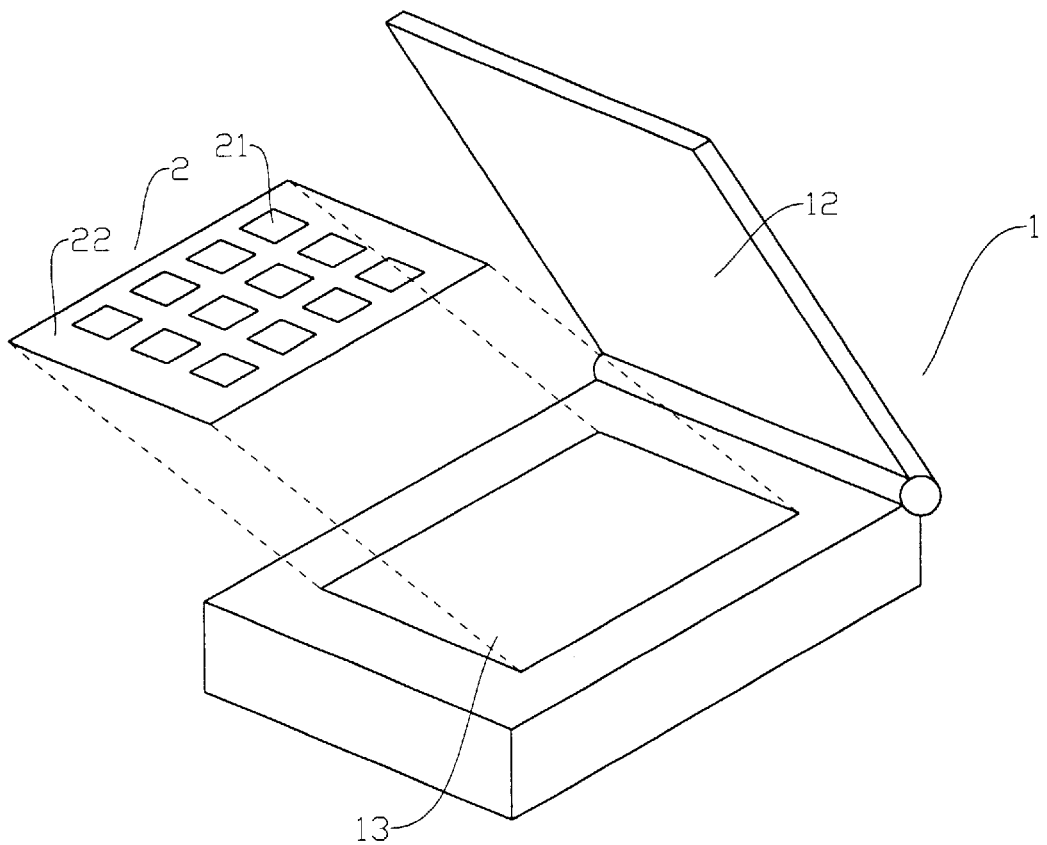
FIG. 2 is another slide scanning process of prior art.
Figure 3:
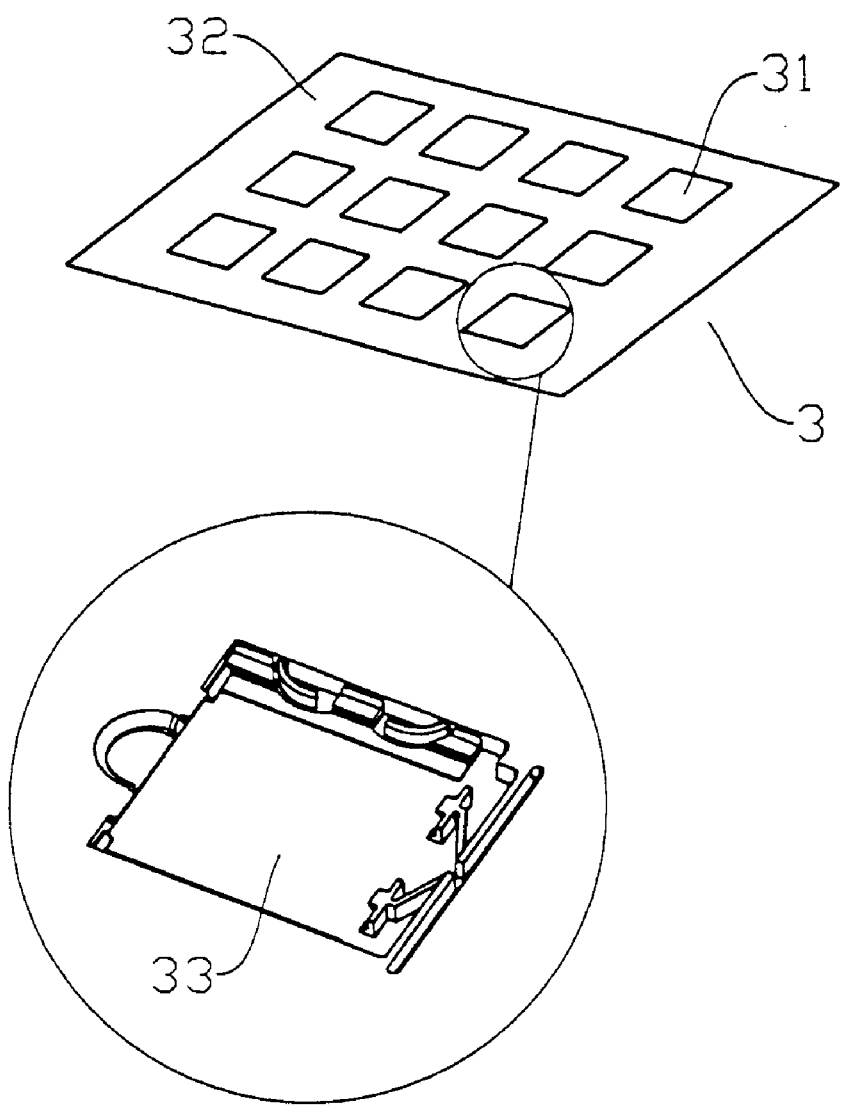
FIG. 3 is the slide frame of the present invention.

Referring to FIG. 3, there is shown the slide securing device 3 for securing slides on the document glass of the flatbed scanner. The slide securing device 3 includes a frame 32 and at least one securing cell 31. The frame 32 can be placed on the document glass of the flatbed scanner, as convention method illustrated in FIG. 2. The securing cell 31 comprises an aperture 33. The area of the aperture 33 is larger than a slide. The slide is therefore able to be placed in.

Figure 4:
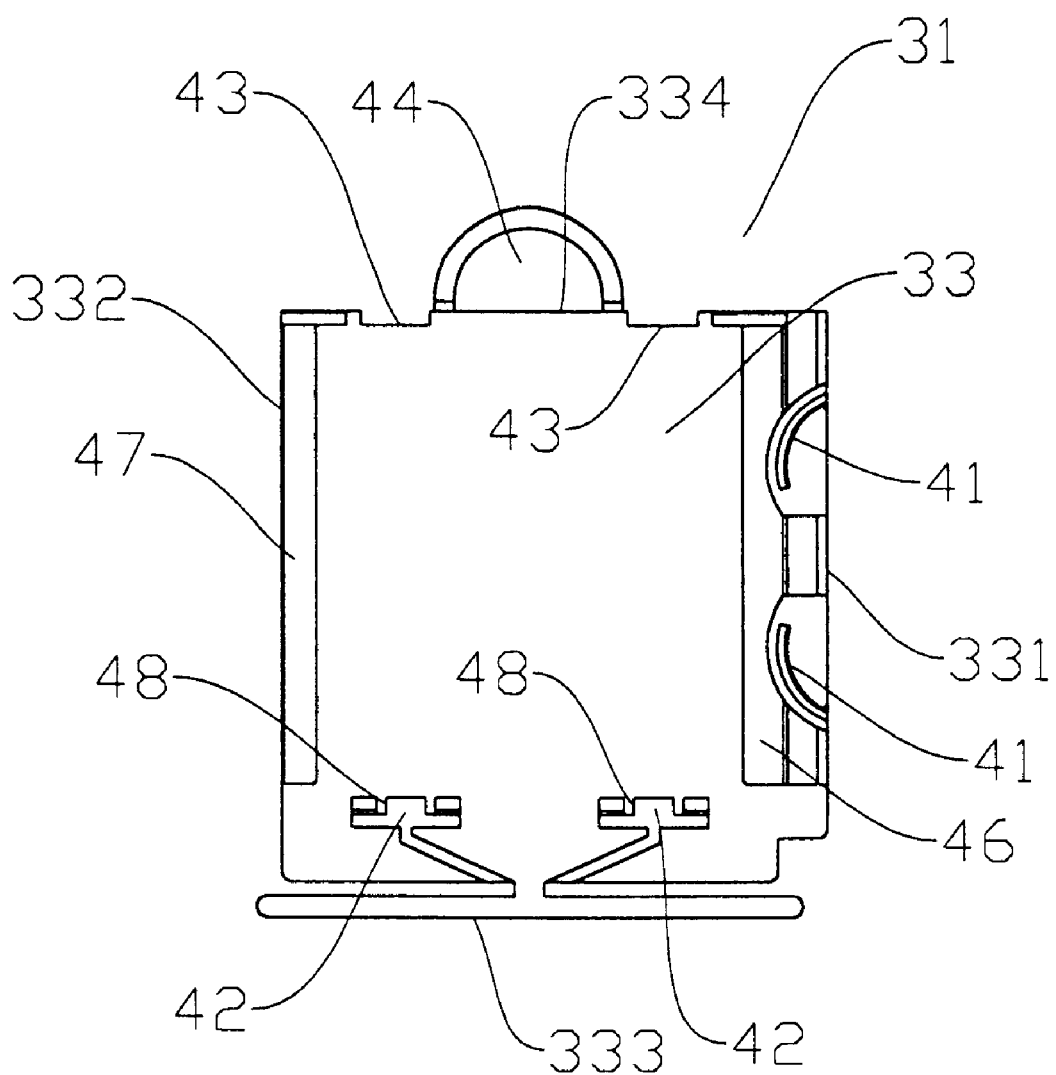
FIG. 4 is a top plan view of the securing cell of the present invention.
Figure 5:
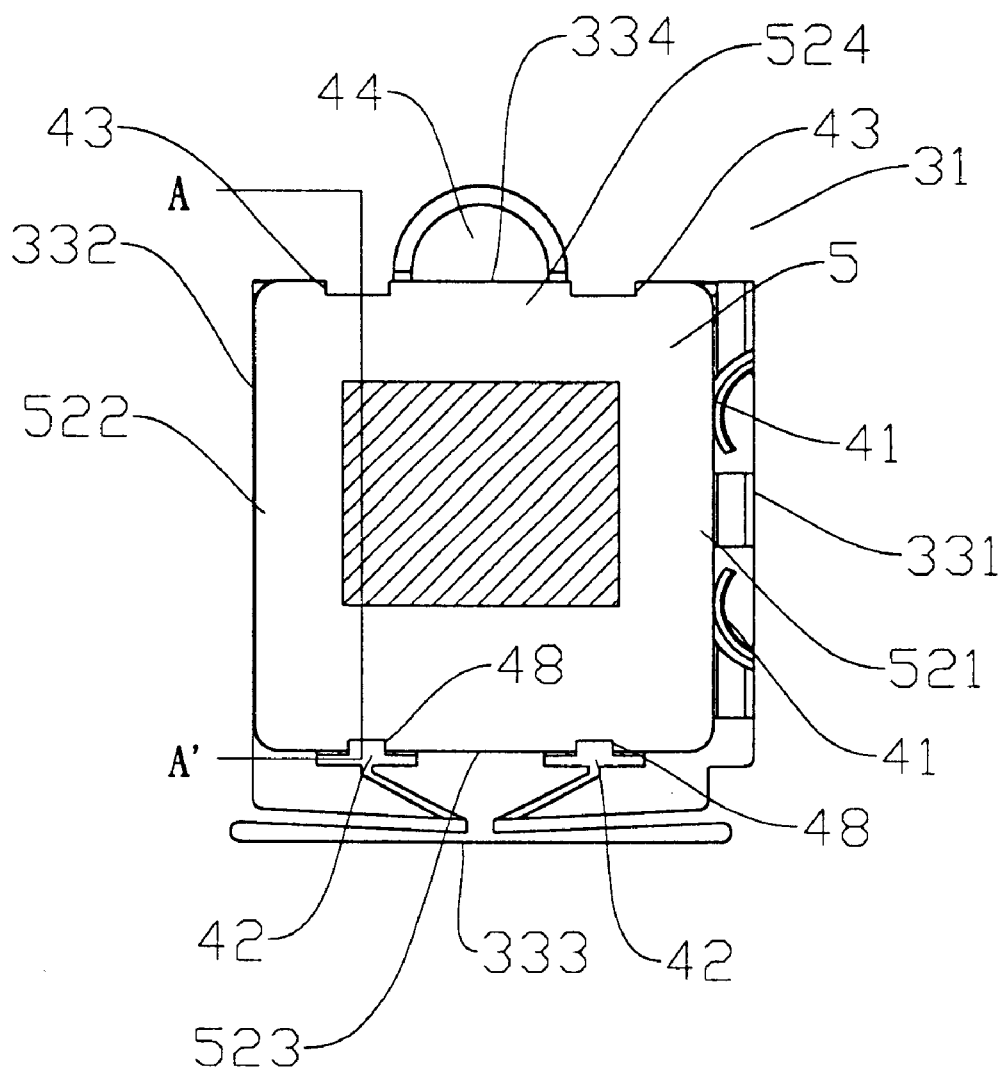
FIG. 5 is a top plan view showing a slide is secured in the securing cell of the present invention.
Figure 6:
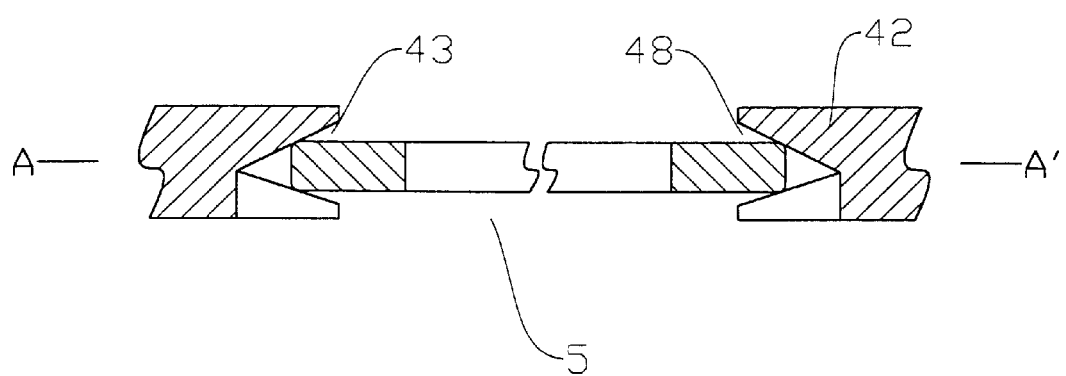
FIG. 6 is a cross section view along A–A' line shown in FIG. 5.

The present invention will be advanced details in view of FIGS. 4, 5 and 6. FIG. 4 is showing the securing cell 31 in details. FIG. 5 is showing a slide mounted in the securing cell 31 in details. FIG. 6 is the cross section view along A–A' line.

In FIG. 4, there is shown that the securing cell 31 has at least a first securing clip 41 and a second securing clip 42. The first securing clip 41 is positioned on the first side 331 of the aperture 33 to provide securing force along the first edge 521 of the slide 5. Thus, the second edge 522 of the slide 5 is able to attach the second side 332 of the aperture 33 by the force from the first securing clip 41. The second securing clip 42 is positioned on the third side 333 of the aperture 33 to provide securing force along the third edge 523. By the securing force, the fourth edge 524 of the slide 5 is able to securely attach to the fourth side 334 of the aperture 33. The main structure of the present invention is illustrated above. The present invention utilizes securing force from two different directions, especially perpendicular directions, to secure the slide 5. The secured slide 5 will not slip or move after the employment of two direction securing force and corresponding reactive force from respective opposite sides of the aperture. Once the securing device 3 is placed on the document glass, the scanner is therefore able to precisely scan the secured slides in the securing device 3 by predetermined parameters and mode.

Further, the aperture 33 includes a first receiving groove 43 and a second receiving groove 48. FIG. 6 shows the cross view of the grooves along line A–A'. The first receiving groove 43 is located on the fourth side 334 of the aperture 33. The fourth edge 524 of the slide 5 attaches the first receiving groove 43 due to the force provided by the second securing clip 42 pushing the third edge 523 of the slide 5. The second receiving groove 48 is located on the same side of the second securing clip 42, and faces to the slide 5. The second receiving groove 48 and the first receiving groove 43 are on the same plane. Once the second securing clip 42 pushes the third edge 523 of the slide 5, the second receiving groove 48 secures the third edge 523 of the slide 5. Because of the force provided by the second securing clip 42, the slide 5 is secured between the first receiving groove 43 and the second receiving groove 48. Due to the grooves are V shapes, the slide 5 which is mounted in the securing cell 31 is not able to move or slip. Thus, the slide 5 is capable of maintaining a fixed height to be canned. The scanner can obtain a good quality of the scanned image and avoid the diffusion problem caused by variant heights of slides. The groove shape can also be U, ∩ or the like for securing and mounting slides at a fixed height, wherein the slides may have different thicknesses.

The aperture 33 further includes a picking portion, which is located on fourth side 334 of the aperture 33. The user can pick up the slide 5 through the picking portion 44. First, the user pushes the slide 5 to the third side 333 of the aperture 33. The third edge 523 of the slide 5 presses and biases the second securing clip 42. Thus, the fourth edge 524 of the slide 5 can leave the first securing groove 43. The user therefor is able to easily remove the slide 5.

The aperture 33 would yet comprise a first support member 46 and a second support member 47. The first support member 46 extends from the bottom of the first side 331 of the aperture 33. The second support member 47 extends from the bottom of the second side 332 of the aperture 33. The slide 5 is fully supported in the securing cell 31 by the first support member 46 and the second support member 47.

Figure 7:
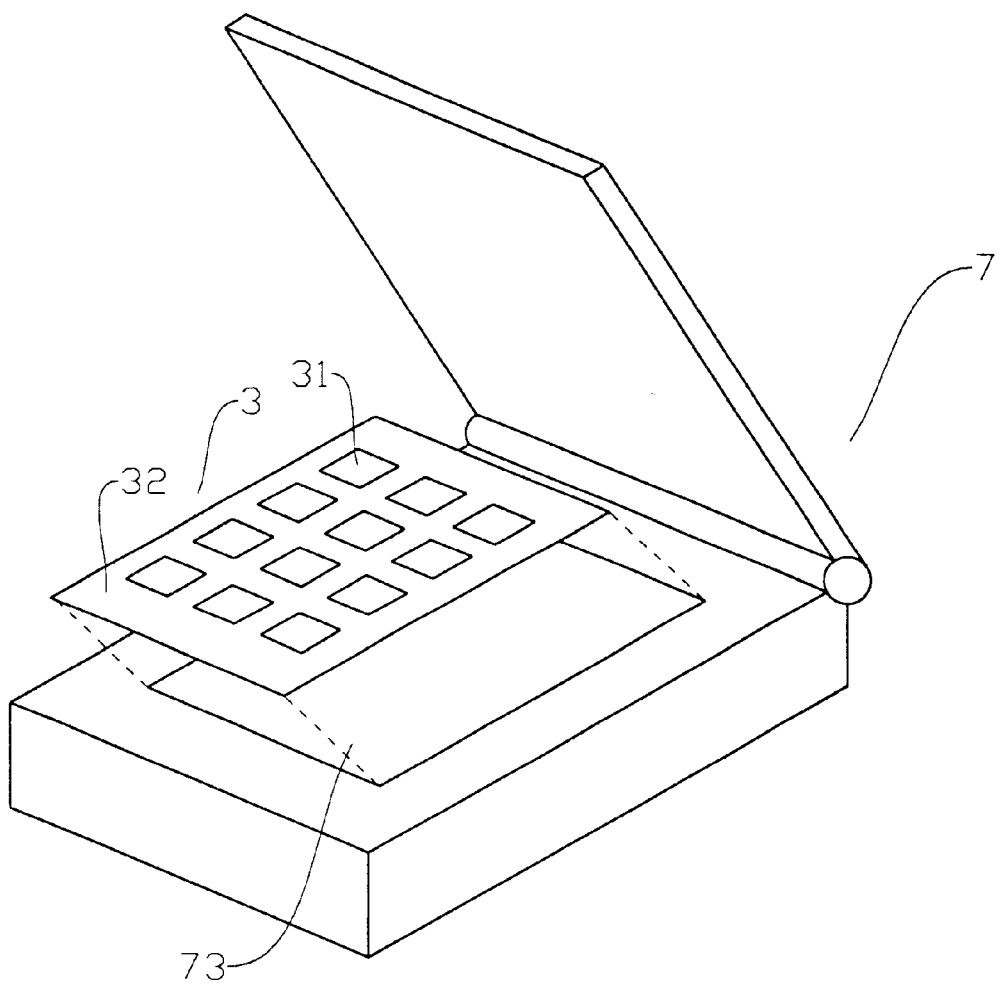
FIG. 7 is a general scheme showing the slide scanning device placed on the document glass of the flatbed scanner.

In view of the convenient usage of the frame 32, the frame 32 can be manufactured the same size as the document glass 73 of the scanner 7. As shown in FIG. 7, the user can easily place the frame 32 on the document glass 73 of the scanner 7. In this concern, the misplacement of the frame 32 would be avoided and the scanner would scan right positions of the slides. Moreover, the securing device can be molded as one piece to reduce the cost and processes of manufacture. By this way, the cost is down and the manufacturing steps are simplified to benefit the competition on the market.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. An apparatus for securing a slide, comprising:
   a frame, placed on a document glass of a scanner; and
   a securing cell, formed in said frame, comprising,
      an aperture having a larger size than the size of a slide,
      a first securing clip, located on a first side of said aperture, providing force to push a first edge of said slide and enforcing a second edge of said slide attaching a second side of said aperture, wherein said second side of said aperture opposite to said first side and said second edge of said slide opposite said first edge of said slide,
      a second securing clip, located on a third side of said aperture, providing force to push a third edge of said slide and enforcing a fourth edge of said slide attaching a fourth side of said aperture, wherein said fourth second side of said aperture opposite to said third side and said fourth edge of said slide opposite said third edge of said slide, and
      a first securing groove, located on said fourth side of said aperture, securing said fourth edge of said slide on said first securing groove during said second securing clip enforcing said third edge of said slide, in order to prevent the movement of slide and maintain a fixed height in said securing cell.

2. The apparatus of claim 1, wherein the size of said frame is same as the size of said document glass.

3. The apparatus of claim 1, wherein said aperture comprises a picking portion, located on the fourth side of said aperture, for picking said slide.

4. The apparatus of claim 1, further comprising:
   a first support member, extending from the bottom of said first side of said aperture, for supporting said slide in said securing cell; and
   a second support member, extending from the bottom of said second side of said aperture, for supporting said slide in said securing cell.

5. The apparatus of claim 1, wherein said first securing groove is V shape.

6. The apparatus of claim 1, wherein said first securing groove is U shape.

7. The apparatus of claim 1, wherein said frame and said securing cell are molded in one piece.

8. The apparatus of claim 1, wherein said second securing clip comprises:

a second securing groove, which is formed on the same plane of said first securing groove, securing said third edge of side slide on said second securing groove when said second securing clip enforces said third edge of said slide, in order to prevent the movement of said slide in said securing cell and maintain said slide at said fixed height.

9. The apparatus of claim 1, wherein said first securing groove is V shape.

10. The apparatus of claim 1, wherein said first securing groove is ∩ shape.

* * * * *